United States Patent
Gailloux

(10) Patent No.: US 7,600,690 B1
(45) Date of Patent: Oct. 13, 2009

(54) METHOD AND SYSTEM FOR TRACKING MEDIA ACCESS INFORMATION ON A PORTABLE DEVICE

(75) Inventor: Mike Gailloux, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 219 days.

(21) Appl. No.: 11/153,659

(22) Filed: Jun. 15, 2005

(51) Int. Cl.
*G06K 7/10* (2006.01)
(52) U.S. Cl. .............. 235/462.46; 235/472.02; 235/486; 235/462.45
(58) Field of Classification Search ........... 235/462.46, 235/382, 472.02, 486, 487, 386, 462.45; 705/14; 455/456.1, 404.2
See application file for complete search history.

(56) References Cited

U.S. PATENT DOCUMENTS

| | | | | |
|---|---|---|---|---|
| 6,776,334 | B1 * | 8/2004 | Garg | 235/384 |
| 7,031,945 | B1 * | 4/2006 | Donner | 705/64 |
| 7,165,725 | B2 * | 1/2007 | Casey | 235/472.01 |
| 2002/0065064 | A1 * | 5/2002 | Griffith et al. | 455/405 |
| 2003/0154242 | A1 * | 8/2003 | Hayes et al. | 709/203 |
| 2004/0198217 | A1 * | 10/2004 | Lee et al. | 45/3.01 |
| 2004/0204063 | A1 * | 10/2004 | Van Erlach | 455/556.1 |
| 2004/0262387 | A1 * | 12/2004 | Hart | 235/384 |
| 2005/0138654 | A1 * | 6/2005 | Minne | 725/31 |
| 2005/0164633 | A1 * | 7/2005 | Linjama et al. | 455/41.2 |
| 2006/0015580 | A1 * | 1/2006 | Gabriel et al. | 709/219 |
| 2006/0022048 | A1 * | 2/2006 | Johnson | 235/462.1 |
| 2006/0025132 | A1 * | 2/2006 | Karaoguz et al. | 455/433 |
| 2006/0091206 | A1 * | 5/2006 | Olsen et al. | 235/384 |
| 2006/0124738 | A1 * | 6/2006 | Wang et al. | 235/385 |
| 2006/0214001 | A1 * | 9/2006 | Chuang et al. | 235/472.01 |

* cited by examiner

Primary Examiner—Edwyn Labaze

(57) ABSTRACT

A method and system provides for tracking access to media content in a portable device and correlating the access with a location of the portable device. In one embodiment, a portable device can wirelessly receive media content during a media access session. The portable device can collect media access information, such as information on the media access session, information on the media content received, and a location of the portable device during the media access session. The portable device can then transmit the media access information through a wireless cellular telecommunications system to a network server.

17 Claims, 6 Drawing Sheets

| Record No. | Date | Time | Duration (minutes) | Channel | Content Provider | Program | Client Station Location (GPS) | ... |
|---|---|---|---|---|---|---|---|---|
| 1 | 05/04/05 | 09:43 | 4 | 12 | ESPN | SportsCenter | W41.8790030, -87.6367520 | ... |
| 2 | 05/04/05 | 12:34 | 2 | 33 | FOX | The Simpsons | W 41.8998793O, -87.6243010 | ... |
| 3 | 05/10/05 | 08:56 | 32 | 45 | CBS | 60 Minutes | W 38.8998748O; -77.0376840 | ... |
| 4 | 06/23/05 | 17:23 | 13 | 12 | ESPN | SportsCenter | W 41.9181320; -87.6493970 | ... |
| ... | ... | ... | ... | ... | ... | ... | ... | ... |

Fig. 4

METHOD AND SYSTEM FOR TRACKING MEDIA ACCESS INFORMATION ON A PORTABLE DEVICE

BACKGROUND

1. Field of the Invention

The present invention provides a method and system for tracking media access on a portable device, and in particular correlating information on the media content with the location of the portable device used to access the media content.

2. Background

Media is everywhere—people seem to constantly watch television, listen to the radio, or play video games. For example, it seems that everywhere you turn there is a television—in houses, in bars and restaurants, and even in building lobbies. But which people are watching which shows?

Information on the number of people accessing media can be very valuable. Services such as Nielsen Media Research and Arbitron measure the size of audiences and, in turn, audience size can be used, for example, to set advertising rates and to assist in an analysis of consumers and media markets.

A question remains, however, as to exactly who is watching the televisions, listening to the radios, and playing the games. For example, different family members—such as a grandparent, parent, teenager, and child—each spanning radically different demographics, can each watch the same television in a house. Similarly, if a television is in a bar or a building lobby, how can anyone—such as advertisers, marketers, or content providers—be sure who is watching that television? Moreover, those people watching television in a bar or a building lobby do not generally control what media is being shown. Therefore, even if an advertiser, marketer, or content provider knew who was watching the televisions in such places, it would still be unknown whether the viewers would choose access the same media if they had control over what they were watching.

Thus, it would be advantageous to have more detailed information on who is accessing what media and where such people are accessing that media. Advertisers and marketers can then, for example, more specifically target advertising and other content toward those people. For instance, if a content provider knew that a large number of people were accessing certain media (for example, watching or listening to a certain program) in a particular location, the content provider could then more specifically understand the market for that content and could target advertising and other content in that location. Similarly, it could be advantageous to know which media particular people access. If advertisers, marketers, or content providers knew exactly which people watch a certain television show, for instance, the advertisers, marketers, or content providers could use that information to more specifically understand the market for that content, target advertising or other content to those people, etc.

Portable devices, such as mobile phones, personal digital assistants ("PDAs"), and other devices capable of receiving media content, can provide individuals with control over which media content to watch or listen to. As technology improves, the ability of these portable devices to present media content also improves. Thus, more and more users of portable devices are accessing media on these devices. Unlike television viewers in a bar or building lobby, each user of a portable device has control over and can decide which media content to access. Moreover, each user of a portable device can access media in different locations.

Thus, there is a need for a way to track information related to a person's media access, including the location of that person while accessing that media.

SUMMARY

According to one embodiment, a method for tracking media access can comprise, during a media access session, wirelessly receiving media content into a portable device; collecting media access information, including information on the media access session, information on the media content received, and a location of the portable device during the media access session; and transmitting the media access information through a wireless cellular telecommunications system to a network server.

According to another embodiment, a portable device can comprise a processor; data storage; a cellular wireless communication interface; and program logic stored in the data storage and executable by the processor (i) to receive media content into the portable device during a media access session; (ii) to collect media access information, including information on the media access session, information on the media content received, and a location of the portable device during the media access session; and (iii) to transmit the media access information through a wireless cellular telecommunications network to a network server, via the cellular wireless communication interface.

According to another embodiment, a system can comprise a portable device; and a network server coupled to the portable device; wherein the portable device comprises a processor, data storage, a cellular wireless communication interface, and program logic stored in the data storage and executable by the processor (i) to receive media content into the portable device during a media access session; (ii) to collect media access information, including information on the media access session, information on the media content received, and a location of the portable device during the media session; and (iii) to transmit the media access information through a wireless cellular telecommunications network to the network server, via the cellular wireless communication interface; and wherein the network server comprises program logic executable to store the media access information.

A variety of alternatives will become apparent to those skilled in the art upon review of the following detailed description.

BRIEF DESCRIPTION OF THE DRAWINGS

Exemplary embodiments of the present invention are described herein with reference to the drawings, in which:

FIG. 4 is a block diagram illustrating example components of an embodiment of an access tracking server;

DETAILED DESCRIPTION OF EXAMPLE EMBODIMENTS

1. Example Architecture

Figure 1:
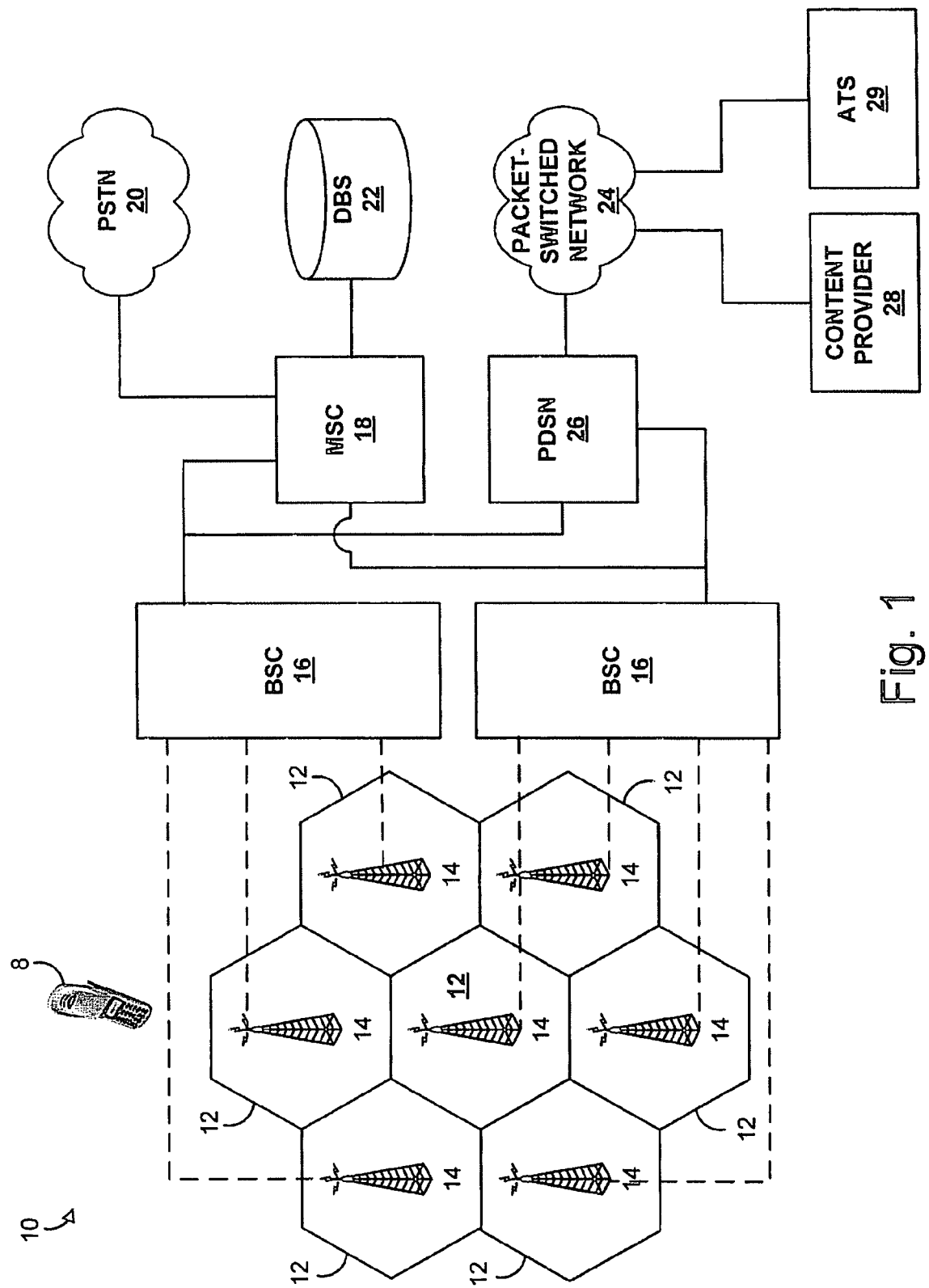
FIG. 1 is a block diagram illustrating example components of an embodiment of a wireless telecommunications network.

FIG. 1 is a block diagram illustrating components of a cellular radio communications system ("wireless telecommunications network") 10. In a typical wireless telecommunications network 10, an area is divided geographically into a number of cells 12. Each cell 12 can by defined by a radio frequency ("RF") radiation pattern from a respective base transceiver station ("BTS") 14 antenna, and each cell 12 can include one or more sectors (not shown). Each BTS 14 typically can transmit and receive wireless communications to and from a plurality of portable devices 8.

Each BTS 14 might connect to a base station controller ("BSC") 16. As its name suggests, the BSC 16 can function to control communications via one or more BTSs 14. For instance, in some arrangements, a BSC might control the power level of signals emitted wirelessly by a BTS and might control the handoff of communications as a portable device 8 moves between sectors within a BTS coverage area or between BTSs.

Each BSC 16 might then be coupled to a telecommunications switch or gateway, such as a mobile switching center ("MSC") 18 and/or a packet data serving node ("PDSN") 26, for instance. The switch or gateway might manage calls and might be coupled to one or more networks 24, such as the public switched telephone network ("PSTN") 20, an ANSI-41D SS7 network, or a packet-switched network 24, which could comprise either or both of a private packet-switched network and a public packet-switched network, such as the Internet. The MSC 18 might also maintain one or more databases ("DBS") 22 that might store customer and system information. In an exemplary embodiment, the MSC might then authenticate and register portable devices 8 on the telecommunications network 10 and process account information for customers.

When a portable device 8 is positioned in a cell 12, the portable device 8 might communicate via an RF air interface with the BTS 14 of the cell 12. Consequently, a communication path can be established between the portable device 8 and the telecommunications network 10, via the air interface, the BTS 14, the BSC 16, and the switch or gateway (the MSC 18 or the PDSN 26, for example).

A portable device 8 might communicate with the BTS 14 using any of a variety of different protocols. For instance, in a TDMA system, each BTS 14 typically communicates on a group of frequencies, and each frequency may itself carry at least one multiplexed call. In a CDMA system, by comparison, each BTS 14 communicates over a spread spectrum of frequencies, and the spectrum may carry many multiplexed calls. Typical components for CDMA systems include those described in the well-known cdma2000 standard. The Global System for Mobile Communications ("GSM") or another method may also be used.

While a traditional voice connection with the telecommunications network 10 might involve establishing a circuit-switched connection between the portable device 8 and another entity for voice communications, the portable device 8 might alternatively establish a data connection with the telecommunications network in order to engage in packet-switched communications with another entity. In addition to interfacing with the MSC 18 and in turn the PSTN 20, the BSC 16 may also interface with the PDSN 26, which can provide connectivity to the packet-switched network 24. Using this connectivity, the portable device 8 can establish a data connection with the telecommunications network 10 and engage in packet-based communications with devices on the packet-switched network 24. In doing so, the portable device 8 might use various protocols to engage in data communications with another device.

In accessing the telecommunications network 10 for data services, the portable device 8 may establish a Point-to-Point Protocol ("PPP") session with the PDSN 26. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662, and 1663, all of which are incorporated herein by reference in their entirety.

While the portable device 8 may communicate with the PDSN 26 through a PPP session, it may communicate with other devices (for example, a device on the packet-switched network 24) using higher level protocols. For example, the portable device 8 may use the Transmission Control Protocol ("TCP")/Internet Protocol ("IP") suite, one protocol suite that may be used for transmitting data over a packet-switched network. Each device, including the portable device 8, may then receive a 32-bit IP address. The IP address assigned to a device is usually globally unique, and therefore allows IP packets of data to be routed between different networks to a particular device. An IP packet can include a header portion and a data portion. The header portion generally identifies a source device and a destination device, while the data portion carries the data to be transmitted between the two devices.

Each portable device 8 may also be uniquely identified in other ways to facilitate identification. For example, each portable device 8 can be hard-coded with a unique electronic serial number ("ESN"), which can be programmed into each portable device during manufacture and which can be initially activated by a service provider. In doing so, the service provider can assign a unique mobile identification number ("MIN") to each portable device and can establish a record or other profile associating the MIN with the ESN and indicating service parameters for the subscriber (i.e., for the MIN).

A number of other entities can reside on or be accessible through the packet-switched network 24. For example, one or more content providers 28 might reside on or be accessible through the packet-switched network 24. The one or more content providers 28 might, for example, comprise a content server or other entity, and may host content that the portable device 8 can request or access. One other such entity might include, by way of example, an access tracking server ("ATS") 29. The ATS 29 may be an HTTP compatible server that can receive access tracking information from a portable device, such as the portable device 8, for example. In this case, the ATS 29 can function to send and/or receive HTTP messages, such as HTTP GET and HTTP POST messages. Any number of other entities might also reside on or be accessible through the packet-switched network 24, as well.

The entities residing on or accessible through the packet-switched network 24 can be arranged in any of a variety of ways. For example, the ATS 29 and/or the content provider 28 might reside on a discrete database server that is coupled to the packet switched network 24 and that is accessible by other network entities. Or the ATS 29 and/or the content provider 28 might reside within another network entity or entities. And as another example, the functions of the ATS 29 and/or the content provider 28 might be integrated with the functions of another network entity. Other configurations are possible as well.

In operation, each portable device 8 that supports packet-data connectivity can engage in packet-data communication over a packet network, such as the packet-switched network 24, after acquiring a radio link over an air interface and a data link with the PDSN 26 or other gateway. For instance, a portable device, such as the portable device 8, can send an origination message to a BSC, such as the BSC 16, and/or an MSC, such as the MSC 18, asking for a radio link for packet-data communication. The BSC 16 can then responsively instruct the portable device 8 to operate on a given traffic channel over the air interface. Through that traffic channel, the portable device 8 might then negotiate with a gateway, such as the PDSN 26, to establish a data link such as the PPP session described above. Further, the gateway and/or some other entity such as a mobile-IP home agent or an authentication, authorization, and accounting server (not shown) could assign an IP address to the portable device 8 for use in communicating over the packet-switched network 24.

Figure 2:
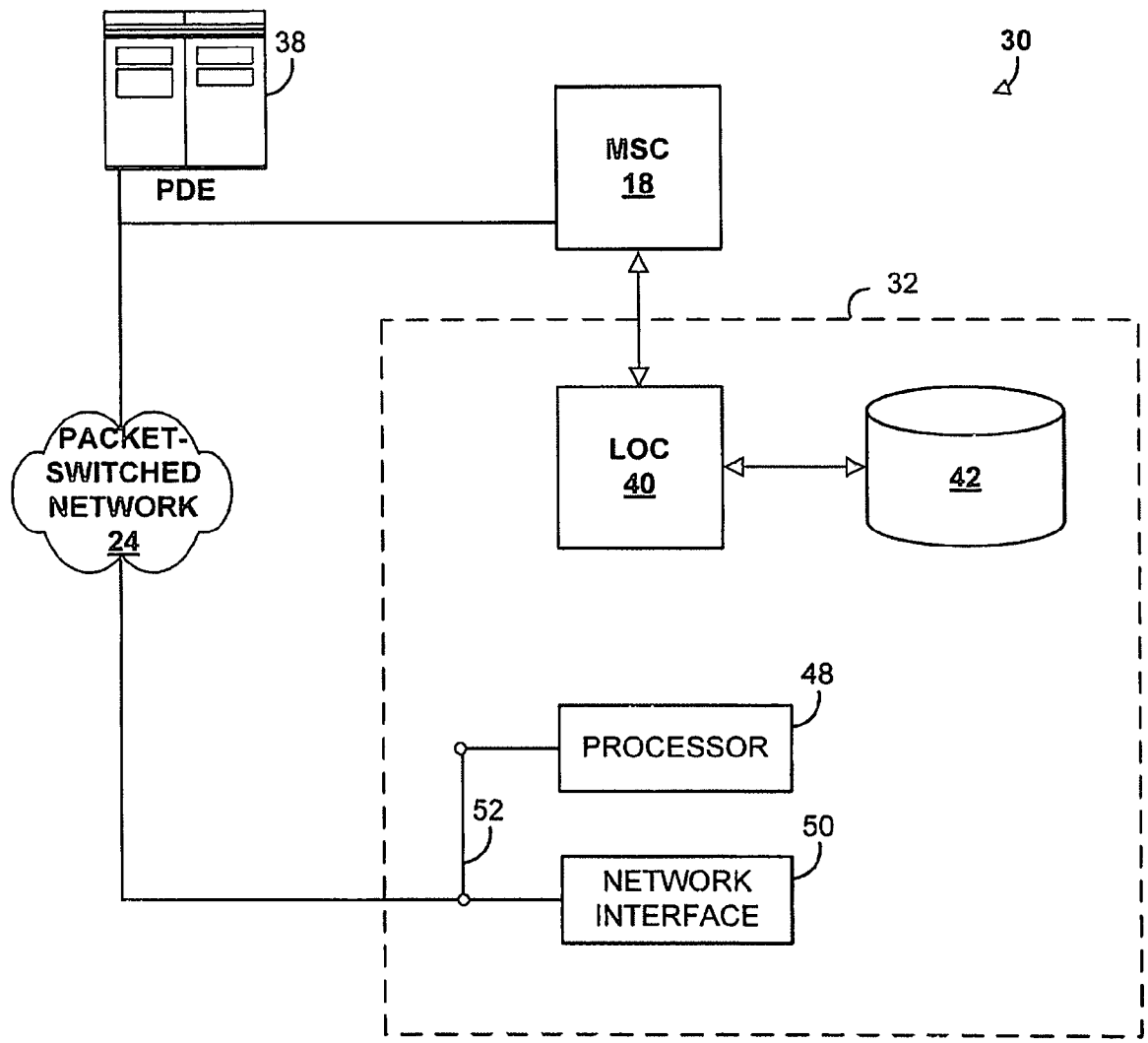
FIG. 2 is a block diagram illustrating example position determining components for an embodiment of a wireless telecommunications network.

FIG. 2 depicts a location system comprising example position determining components 30 that might be used to track the locations at which the portable device 8 is used in the example wireless telecommunications network 10 of FIG. 1. In some embodiments, the location system functions to determine, track, and/or report the location of subscriber terminals, such as the portable device 8. As such, the location system and position determining components 30 could take a variety of forms. For example, the position determining components 30 might include position determining equipment ("PDE") 38 and a mobile positioning center ("MPC") 32 as defined by industry standard TIA/EIA IS-801 and J-STD-036, for instance.

The PDE 38 can be any system for determining the location of one or more portable devices 8. As an example, the PDE 38 might comprise a network-based location determination system, such as a home location register ("HLR") that can maintain a record of the cell 12 and sector in which each portable device 8 is operating. As another example, the PDE 38 might comprise a triangularization system that can determine where a portable device 8 is located based on a comparison of relative signal strengths from several measuring points. Alternatively or additionally, the PDE 38 might comprise a portable device-based (or, more generally, subscriber-based) position determining system, such as a GPS receiver in a portable device 8, as well as functionality to communicate that location information from the portable device 8 to the telecommunications network 10. In another embodiment, the PDE 38 might be integrated with one or more BTSs 14 of the wireless telecommunications network 10 and might also include other RF processing or collating devices for providing the geographical coordinates of one or more portable devices 8 to the MPC 32. Many other examples are also possible.

The PDE 38 might determine the position of a portable device 8 by a variety of methods. For example, the PDE 38 might instruct a particular portable device 8 to activate a GPS receiver associated with the portable device 8 and to relay the coordinates of the portable device 8 to the PDE 38. In another example, the PDE 38 might instruct the portable device 8 to measure the relative signal strengths of three or more BTSs 14, and the relative signal strengths might then provide a basis for a calculation of the location of the portable device 8. In yet another example, the PDE 38 might instruct three or more BTSs 14 to measure the signal strength of the portable device 8, and the PDE 38 might then calculate the position of the portable device 8 based on the measurements. Additional methods for measuring position might also include a time difference of arrival ("TDOA") method or an angle of arrival ("AOA") method. Other examples are possible as well.

In some embodiments, the location of a portable device 8 can be identified by location coordinates according to the World Geodetic System 1984 (WGS-84) standards for geodetic reference. The PDE 38 might update the location of a portable device 8 once a user changes the location of the portable device 8, or the PDE 38 might update the location of a portable device 8 only in response to other entities querying the PDE 38 for the location of the portable device 8. Other examples are possible as well.

The MPC 32 can generally be a database application executed on a service control point and can function to store the location of one or more portable devices 8. In an exemplary embodiment, the MPC 32 can maintain a record of the location of each portable device 8, as determined by the PDE 38. In an exemplary embodiment, the MPC 32 might communicate with other entities of the wireless telecommunications network 10, such as the MSC 18 (or another switch or gateway such as the PDSN 26), either directly or through the packet-switched network 24. In turn, one or more entities can query the MPC 32 to determine the location of a given portable device 8, and the MPC 32 can report the requested location.

In one embodiment, the MSC 18 (or another switch or gateway such as the PDSN 26) might receive from a portable device 8 a notification that the portable device 8 is accessing media. In some embodiments, such a notification can comprise a request for media from the portable device 8. In other embodiments, such a notification can comprise an indication that the portable device 8 is using a tuner to receive and access media. In any case, the MSC 18 (or another gateway) might then transmit that request to the MPC 32, which might then process that request and provide location information for forwarding to the portable device 8 (or another entity such as a network server).

The MPC 32 can include various functional elements, including a location manager ("LOC") 40 with an associated LOC database 42. The functional elements within the MPC 32 might be in the form of separate computing devices, such as servers or computers, in the form of separate but interacting computer programs running on a single server or computer, or in any of a number of other configurations.

In some embodiments, an operating environment for the MPC 32 and associated devices can include a processing system with at least one processor 48 and a memory system. One or more processors 48 might then control the operations of the MPC 32 and might also instruct the memory system of the MPC 32 to read or write data to or from databases, such as the database 42, for example.

The MPC 32 might also comprise one or more network interface components 50 through which the MPC 32 might communicate with the packet-switched network 24 and/or with the MSC 18 or with other switches or gateways. The various components of the MPC 32 (including the processor 48 and the network interface 50) might be coupled together directly or via a system bus 52, for instance. Other arrangements are possible as well.

The LOC 40 might coordinate the operations of the PDE 38 and maintain the LOC database 42 that comprises unique portable device identifications (such as network access identifiers ("NAIs")) correlated with location information of particular portable devices. In an exemplary embodiment, the LOC 40 can receive positional data from the PDE 38 and can use the data to form a determination of a portable device's position. In operation, the LOC 40 might query the PDE 38 to determine the position of a particular portable device 8 (for instance, a portable device 8 that has accessed or is accessing media). In other embodiments, the portable device 8 can include GPS equipment for determining the GPS coordinates of the portable device 8. When the portable device 8 accesses media, the portable device 8 might then make a GPS measurement and then store that measurement and/or relay its GPS coordinates to the LOC 40 through the MSC 18. In any case, the LOC database 42 might then store location information of particular portable devices. Other examples and configurations are possible as well.

Figure 3:
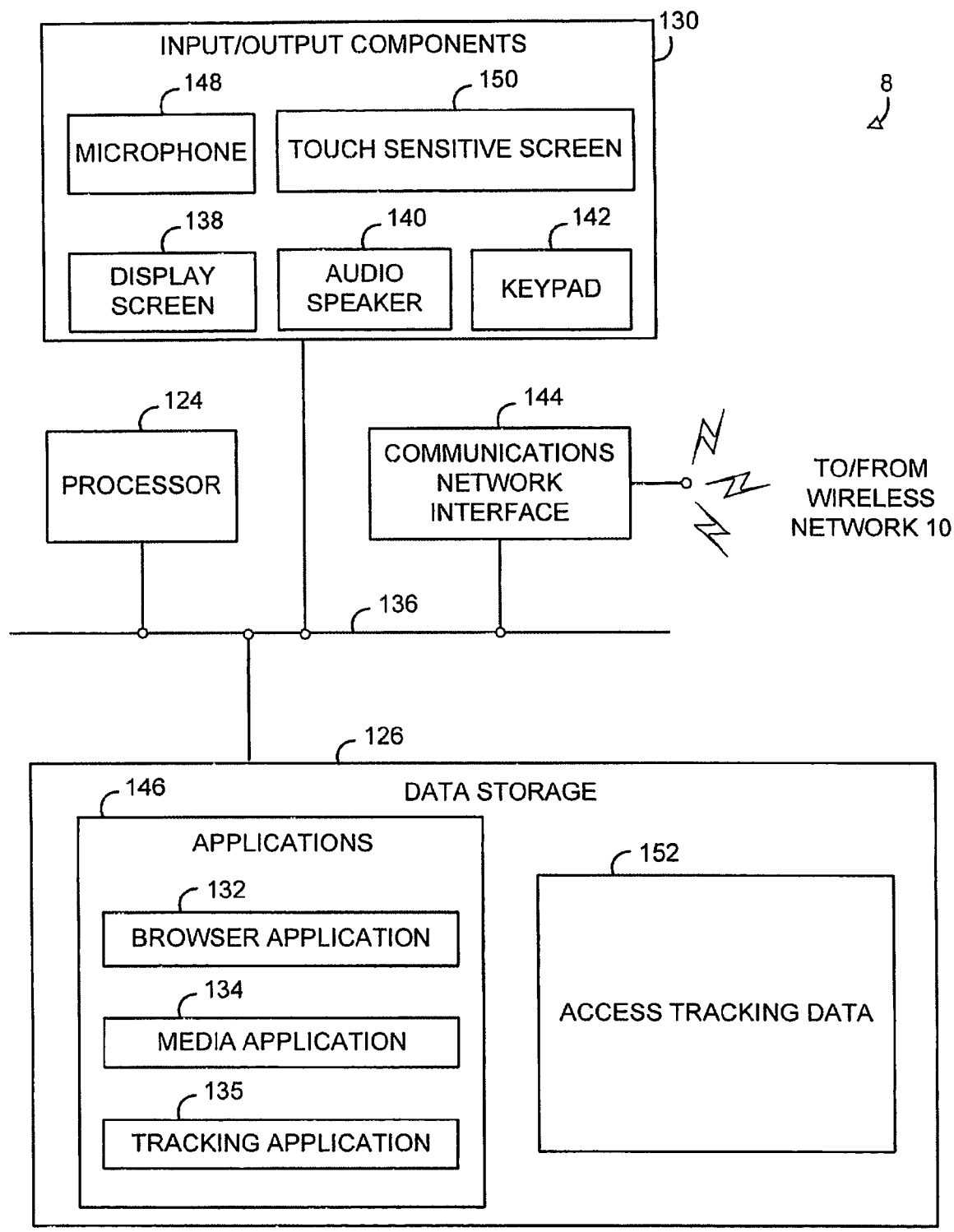
FIG. 3 is a block diagram illustrating example components of an embodiment of a portable device.

FIG. 3 is a block diagram showing some of the components of an exemplary portable device 8. An exemplary portable device 8 might include a processor 124, data storage 126, and machine language instructions stored in the data storage 126 and executable by the processor 124 to perform various functions described herein. The machine language instructions might define applications 162 that might also be stored in the data storage 126. The portable device 8 might also comprise a wireless network interface component 144 through which the portable device 8 can communicate with a wireless telecommunications network 10. Further, the portable device 8 might comprise input and output components 130. The various components of the portable device 8 (including the processor 124, the data storage 126, the wireless network interface 144, and the input and output components 130) might be coupled together directly or via a system bus 136, for instance. Other arrangements are possible as well.

As shown by way of example in FIG. 3, the input and output components 130 might comprise a display screen 138, an audio speaker 140, a keypad 142, a microphone 148, and a touch sensitive screen 150, although the portable device 8 might also have different, additional, and/or fewer input and/or output components than those shown in FIG. 3. In an exemplary embodiment, the portable device 8 might have multimedia capabilities, such as an ability to display video and play audio, for example. In other embodiments, however, the portable device 8 might not have multimedia capabilities, or the portable device 8 might be capable of only playing audio or of only displaying video, or it might be limited in some other way, such as by not having a color display screen 138 or an audio speaker 140.

The data storage 126 can store applications 146 that can be executed by the processor 124. The data storage 126 can also include data, such as access tracking data 152, for example. In alternative embodiments, one or more applications 146 (such as the tracking application 135, for example) and/or data (such as the access tracking data 152, for example) might not be stored in the portable device 8. In such embodiments, applications 146 and/or data might be stored remotely on a network server, such as the ATS 29, for example. The remote network server can then be accessible to the portable device 8, and the portable device 8 may then access such applications 146 or data via the wireless network 10.

In an exemplary embodiment and as shown in FIG. 3, the data storage 126 can include a web browser application 132 and one or more media applications 134. The applications 146 might utilize the various input and output components 130 of the portable device 8 and, thereby, interact with the user. For example, one or more applications might output video on the display screen 138, play audio on the speaker 140, receive input from the keypad 142 or the touch sensitive screen 150, or perform a combination of these or other actions.

The browser application 132 might be an application suitable for communicating via a packet-switched network, such as the packet-switched network 24. In some embodiments, the browser application 132 might be a typical Web browser or an enhancement of a typical Web browser, such as an OpenWave™ Microbrowser Web browser, for example. In any case, the browser application 132 can request media content from a content provider, such as the content provider 28, via the packet-switched network 24. In some embodiments, the browser application 132 can request media content (or other information) by invoking a URL included in a WAP Push message or via an HTTP GET request. Further, the browser application 132 can communicate with other entities, such as the ATS 29, by sending information to those entities via an HTTP POST message. Other examples are also possible.

The one or more media applications 134 might be suitable to present media content that various content providers, such as the content provider 28, for example, might send to the portable device 8. In particular, the media applications 134 can function to present media, such as broadcast television or radio, or streaming television or radio, for example, on the portable device 8. A portable device 8 might support more than one media application 134, and in some embodiments a user may add or remove media applications 134 from the portable device 8.

In the case of broadcast media, such as broadcast television or radio, the media applications 134 (or other applications 146 in the portable device 8) might receive broadcast signals via one or more of radio frequency or satellite broadcast signals. In such embodiments, the portable device 8 can include a tuner that can receive either RF or satellite signals and can include a tuner application (which might be separate from or a part of the media application 134 and/or the browser application 132) that can interface with the tuner and that can provide for channel or station switching on the portable device 8. Other examples are possible as well. The tuner application referred to in this paragraph will hereinafter sometimes be referred or included under the general term "the media application 134."

In the case of streaming media, such as television or radio, the media application 134 might be an industry standard MP3 audio and/or MPEG video player, or other such players supporting media encoding now known or later developed. In some embodiments, the media application might support the digital video broadcasting ("DVB") protocol and/or the digital sound broadcasting ("DSB") protocol. In streaming media embodiments, the portable device can also include a coder-decoder ("CODEC") that can convert the digital media signals received by the portable device 8 into analog audio and/or video signals understandable by a user of the portable device 8. In any case, one or more browser applications 132 and/or one or more media applications 134 can allow a user of the portable device 8 to access incoming media signals, by allowing the user to select a particular channel, signal, etc., to view, listen to, or interact with. Other examples are possible as well.

The tracking application 135 in turn might be an application that can track information related to media content accessed by a user of the portable device 8. By way of example, some of the information that the tracking application 135 might track includes (1) the media content accessed (the channel watched, the radio station listened to, the content provider, for example); (2) the name of the particular media content accessed (the name of a show, radio program, game played, for example); (3) the duration the media content was accessed (how long a show was watched or listened to, or how long a game was played, for example); (4) the date/time that the media content was accessed; and (5) the location of the portable device 8 when the media content was accessed. Other examples are possible as well. The tracking application 135 can obtain some or all of the information it tracks from the other applications of the portable device 8 and other components of the portable device 8, such as a tuner.

By way of example, in embodiments in which the portable device 8 accesses broadcast media content, the tracking application 135 can obtain channel information (and other information related to the media content being accessed) from a tuner or a tuner application in the portable device 8. For instance, applications 146 in the portable device 8 can log the channel or station to which the tuner is tuned, the duration for which the tuner tuned into that channel or station, the time and date that channel or station were tuned, etc. Similarly, as another example, applications 146 in the portable device 8 can obtain information on the media content being accessed, such as the name of shows or programs watched or listened to by users of the portable device 8, by receiving information via the radio broadcast data system ("RBDS"), through closed captioning technology, or through other like technologies.

In embodiments in which the portable device 8 accesses streamed media content, the tracking application 135 can obtain channel information (and other information related to the media being accessed) from metadata embedded in the streamed media content or transmitted with the streamed media content, and this information might be extracted by one or more of the applications 146. The browser application 132 and the media application 134 might provide other information, such as the duration the media content was accessed and the time and date the media content was accessed.

Further, the tracking application 135 can obtain information on the position of the portable device 8 when the portable device 8 accesses media content. In some embodiments, the tracking application 135 (or another application 146 in the portable device 8) can query the MPC 35 for information on the location of the portable device 8. In other embodiments, the portable device 8 can obtain location information itself. For example, the portable device 8 might include GPS equipment that can determine the GPS coordinates of the portable device 8 when the portable device 8 accesses media content. Other examples are possible as well.

The tracking application 135, or another application, can store access information. In one embodiment, the tracking application 135 can store access information in the access tracking data 152, which might be a part of the data storage 126 of the portable device 8. The stored access information might include a record for each time the portable device 8 accesses media content, and each record can include information related to the media content that the portable device 8 accessed. Further, the tracking application 135 can create a record each time the portable device 8 accesses media content. In some embodiments, the tracking application 135 can create a record when the portable device 8 begins to access media content (for instance, when a particular station or channel is tuned), when the portable device 8 stops accessing media content or changes the media content it is accessing (for instance, when a station or channel is changed or when the media application 134 is terminated), or when the portable device 8 changes locations. For convenience, this specification will sometimes use the term "media access session" to refer to each time the portable device 8 accesses media content.

FIG. 4 depicts an example table of media access information that can be stored in the access tracking data 152 by the tracking application 135. As depicted in FIG. 4, each record can correspond to a media access session and is depicted as a row in the exemplary data table. Each record might in turn include a plurality of fields, which are depicted as columns. The table depicted in FIG. 4 is merely an example, and other embodiments of an access tracking data table might include fewer, more, and/or different records or fields. Further, the entries included in the access tracking data table are examples only.

In any case, in some embodiments, the tracking application 135 can interface with the browser application 132 to send access information to a network server, such as the ATS 29. For example, the tracking application 135 might send to the ATS 29 (via an HTTP POST message, for example) access information data for one or more media access sessions of the client device 8. In such a case, the ATS 29 might maintain access information containing data similar to the access tracking data table of FIG. 4, and the ATS 29 might associate such access information with a particular portable device 8 (using the MIN or ESN of the portable device 8, for example).

Figure 5:
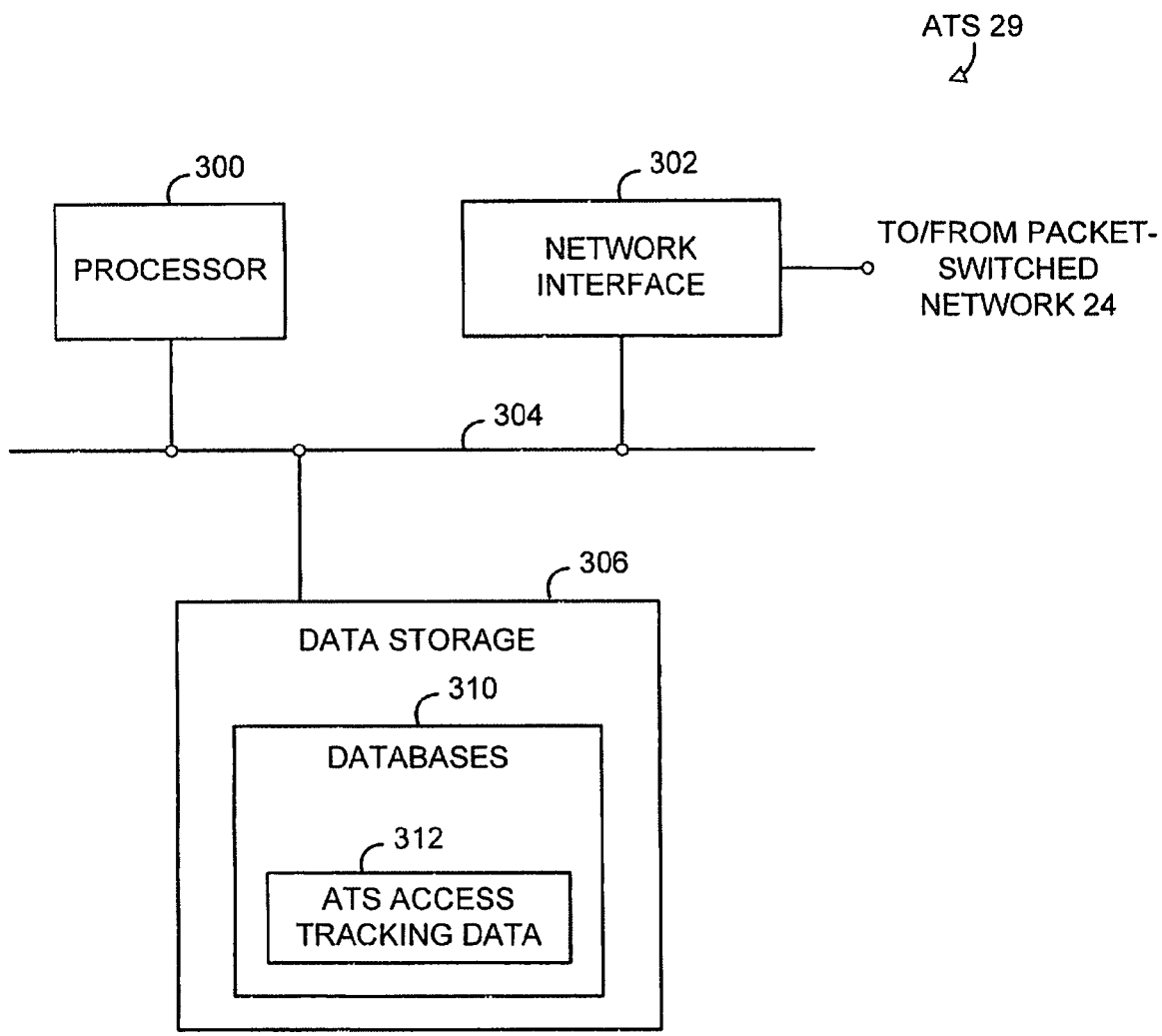
FIG. 5 is an example access tracking table, which includes example media access information.

FIG. 5 is a block diagram showing components of an exemplary access tracking server, such as the ATS 29 shown in FIG. 1. As shown in FIG. 5, the ATS 29 can include a processor 300, data storage 306, and machine language instructions stored in the data storage 306 and executable by the processor 300 to carry out various functions described herein. The machine language instructions can define applications 308 that can also be stored in the data storage 306. The ATS 29 can also include a network interface component 302 through which the ATS 29 can communicate with the packet-switched network 24, for instance. The various components of the ATS 29 (including the processor 300, the data storage 306, and the network interface 302) might be coupled together directly or via a system bus 304, for instance. Other arrangements are possible as well.

The data storage 306 of ATS 29 can include any number of databases 310 (or other files of information) for, among other things, facilitating the storage of records of media access information. In one embodiment, the data storage 306 might include ATS access tracking data 312. The ATS access tracking data 312 might include a plurality of records containing information similar to the records depicted in FIG. 4 and described above. The ATS access tracking data 312 might further include a field identifying a particular portable device that corresponds to each record, and/or might group each set of records to correspond to a particular portable device. By associating a portable device with each access session, the ATS access tracking data 312 can facilitate (or can be used to facilitate) associating each media access session with particular demographic identifiers, thereby making the ATS access tracking data 312 more informative and valuable.

Interested parties can then use, analyze, track, sort, filter, etc., the ATS access tracking data 312. This information can include, for example, when and for how long an individual user of the portable device 8 accessed specific media content or media generally; what media (such as the channels, stations, programs, and/or content providers, for example) an individual user of the portable device 8 has accessed; and what media (such as the channels, stations, programs, and/or content providers, for example) an individual user of the portable device 8 has accessed at a particular location or locations.

Further, the ATS access tracking data 312 for one particular user can be analyzed with the ATS access tracking data 312 of other users to provide media access information and media access trends for multiple users. Multiple user information can help determine audience ratings for media content, such as which content is accessed the most (and when and for how long that content is accessed); location-based trends, such as which content is accessed the most at a particular location (and when and for how long that content is accessed); and demographic information, such as the demographics of users accessing particular media content, for example.

In any case, in some embodiments, the data storage 306 might reside on the ATS 29. In other embodiments, some or all of the data in the data storage 306 might reside on other devices. In such a case, each data storage device may communicate with the ATS 29 via a link such as a T1, IEEE 488, or Ethernet link, for example.

The ATS 29 might connect to the packet-switched network 24 through any type of network, such as a LAN. The ATS 29 might connect to the LAN using a network interface 302, such as a NIC, and the LAN, in turn, might provide connectivity to the packet-switched network 24 through an ISP or another gateway. Alternatively, the ATS 29 might connect to a private intranet (e.g., a core packet network of a wireless service provider) or to another network that provides connectivity to the packet-switched network 24. Further, the ATS 29 might connect directly to the packet-switched network 24 without connecting through a LAN. The ATS 29 might also wirelessly connect to the packet-switched network 24.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

2. Exemplary Operation

Figure 6:
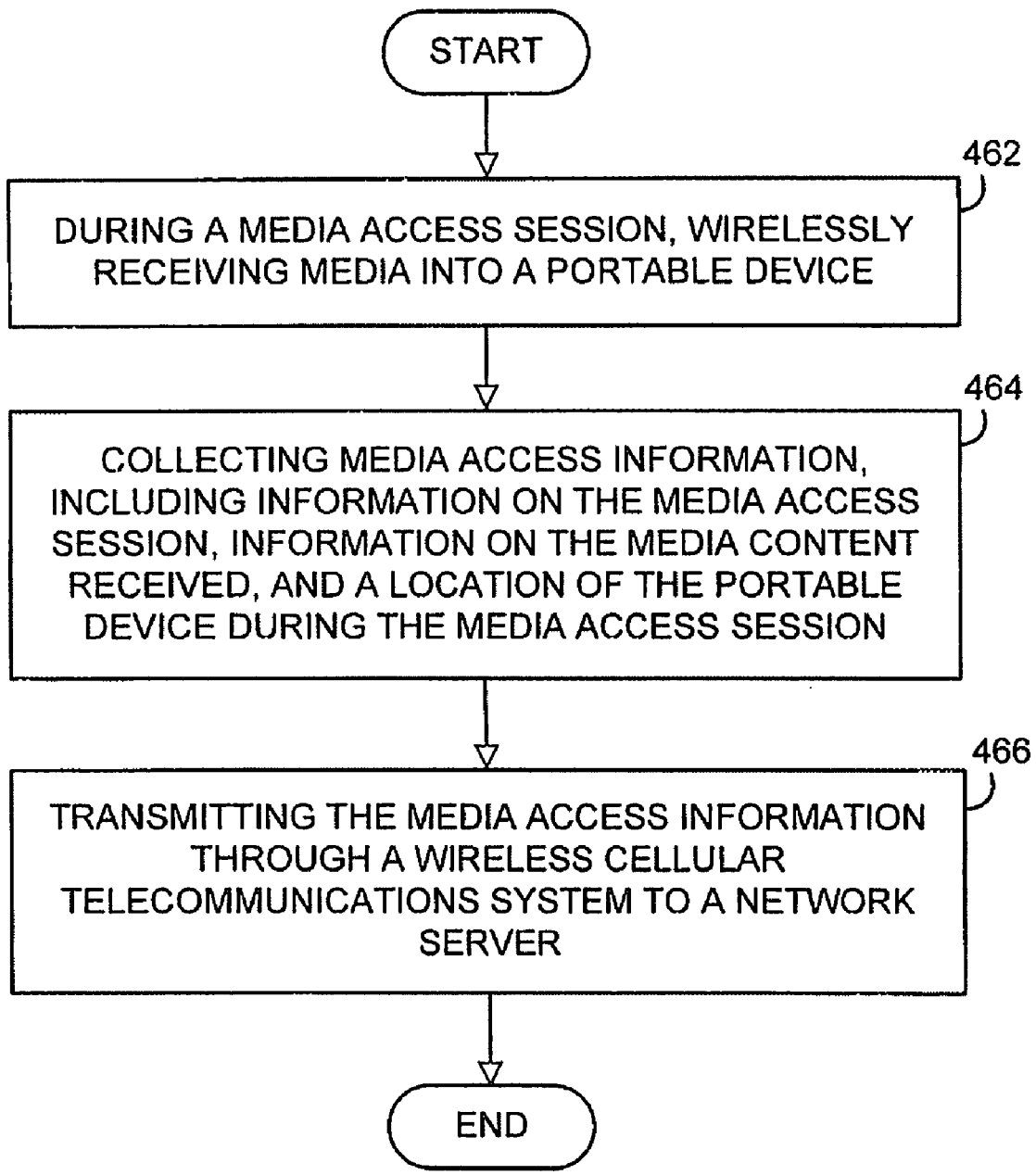
FIG. 6 is a flowchart illustrating an example access tracking process carried out by a system as described in the embodiments herein.

FIG. 6 is a flowchart that depicts functions that might be involved in tracking media access sessions of a portable device 8 in communication with the wireless telecommunications network 10 of FIG. 1.

At step 462 of FIG. 6, a portable device 8 can wirelessly receive media during a media access session. Any number of content providers, such as the content provider 28 depicted in FIG. 1, can send media content to the portable device 8. As discussed above, the content can include any form of media, which, broadly construed, can include (individually or in any combination) audio, video, text, and games, for example.

At step 464 of FIG. 6, an entity, such as the portable device 8, for example, can collect information on the media access session, the media received, and the location of the portable device 8 during the media access session. This information can be stored as records in the data storage 126 of the portable device 8, for example. Further, the information on the media access session can include information such as the date of the media access session, the time of the media access session, and/or the duration of the media access session. The information on the media content received can include information such as a channel or a station on which the media content was broadcast; the name of a program, a show, or a game received; and/or an identification of a provider of the media content.

At step 466 of FIG. 6, an entity, such as the portable device 8, can wirelessly transmit information on the media access session, the media received, and the location of the portable device 8 to a network server, such as the ATS 29. In some embodiments, the portable device 8 can transmit the media access information via a wireless packet data connection. The ATS 29, in turn, can collect information on media access sessions from a plurality of portable devices 8.

3. Conclusion

Several example embodiments of the present invention have been described above. Those skilled in the art will understand, however, that changes and modifications may be made to these embodiments without departing from the true scope and spirit of the present invention, which is defined by the claims.

I claim:

1. A method for tracking a location of a portable device when accessing media, comprising:
   during a media access session, wirelessly receiving media content into a portable device;
   collecting media access information, including information on the media access session, information on the media content received, and a location of the portable device in a wireless cellular telecommunications network during the media access session; and
   transmitting the media access information through the wireless cellular telecommunications network to a network server;
   wherein the media content received during the media access session includes at least a portion of full content; and
   wherein the portable device receives media content during a first media access session at a first location and during a second media access session at a second location, further comprising:
      collecting media access information at the first location and transmitting the media access information for the first location through the wireless cellular telecommunications network to the network server; and
      thereafter collecting media access information at the second location and transmitting the media access information for the second location through the wireless cellular telecommunications network to the network server.

2. The method of claim 1, wherein the media content comprises broadcast media.

3. The method of claim 2, wherein the broadcast media is sent via radio frequency signals.

4. The method of claim 2, wherein the broadcast media is sent via satellite signals.

5. The method of claim 1, wherein the media content comprises streaming media.

6. The method of claim 1, wherein information on the media access session includes information selected from a group consisting of a date of the media access session, a time of the media access session, and a duration of the media access session.

7. The method of claim 1, wherein information on the media content received includes information selected from a group consisting of a channel or a station transmitting the media content; a name of a program, a show, or a game received; and an identification of a provider of the media content.

8. The method of claim 1, wherein wirelessly transmitting the media access information through the wireless cellular telecommunications network to the network server comprises transmitting the media access information via a wireless packet data connection.

9. The method of claim 1, wherein a plurality of portable devices engage in one or more media access sessions and wherein the network server collects media access information, including information on the one or more media access sessions, information on the media content received, and the location of each of the portable devices during the one or more media access sessions, from the plurality of portable devices.

10. A portable device comprising:
a processor;
data storage;
a cellular wireless communication interface; and
program logic for tracking a location of the portable device when accessing media, the program logic stored in the data storage and executable by the processor (i) to receive media content into the portable device during a media access session; (ii) to collect media access information, including information on the media access session, information on the media content received, and a location of the portable device in a wireless cellular telecommunications network during the media access session; and (iii) to transmit the media access information through the wireless cellular telecommunications network to a network server, via the cellular wireless communication interface; and
wherein the media content received during the media access session includes at least a portion of full content; and
further comprising program logic stored in the data storage and executable by the processor (i) to receive media content during a first media access session at a first location, to collect media access information at the first location, and to transmit the media access information for the first location through the wireless cellular telecommunications network to the network server, and thereafter (ii) to receive media content during a second media access session at a second location, to collect media access information at the second location, and to transmit the media access information for the second location through the wireless cellular telecommunications network to the network server.

11. The portable device of claim 10, wherein the media content comprises broadcast media.

12. The portable device of claim 10, wherein the media content comprises streaming media.

13. The portable device of claim 10, wherein wirelessly transmitting the media access information through the wireless cellular telecommunications network to the network server comprises transmitting said information via a wireless packet data connection.

14. The method of claim 10, wherein a plurality of portable devices engage in one or more media access sessions and wherein the network server collects media access information, including information on the one or more media access sessions, the media content received, and the location of each of the portable devices during the one or more media access sessions, from each one of the plurality of portable devices.

15. A system comprising:
a portable device; and
a network server coupled to the portable device;
wherein the portable device comprises a processor, data storage, a cellular wireless communication interface, and program logic for tracking a location of the portable device when accessing media, the program logic stored in the data storage and executable by the processor (i) to receive media content into the portable device during a media access session; (ii) to collect media access information, including information on the media access session, information on the media content received, and a location of the portable device in a wireless cellular telecommunications network during the media session; and (iii) to transmit the media access information through the wireless cellular telecommunications network to the network server, via the cellular wireless communication interface; and
wherein the network server comprises program logic executable to store the media access information;
wherein the media content received during the media access session includes at least a portion of full content; and
wherein the portable device further comprises program logic stored in the data storage and executable by the processor (i) to receive media content during a first media access session at a first location, to collect media access information at the first location, and to transmit the media access information for the first location through the wireless cellular telecommunications network to the network server; and thereafter (ii) to receive media content during a second media access session at a second location, to collect media access information at the second location, and to transmit the media access information for the second location through the wireless cellular telecommunications network to the network server.

16. The system of claim 15, further comprising a plurality of portable devices, wherein each of the portable devices:
engages a media access sessions;
collects media access information, including information on the media access session, the media content received, and a location of the portable device during the media session; and
transmits the media access information through a wireless cellular telecommunications network to the network server, via the cellular wireless communication interface; and
wherein the network server comprises program logic executable to store the media access information received from each of the portable devices.

17. The system of claim 15, wherein wirelessly transmitting the media access information through the wireless cellular telecommunications network to the network server comprises transmitting said information via a wireless packet data connection.

* * * * *